United States Patent

Lisec

[11] Patent Number: 5,944,244
[45] Date of Patent: Aug. 31, 1999

[54] APPARATUS FOR DIVIDING LAMINATED GLASS

[76] Inventor: Peter Lisec, Bahnhofstrasse 34, A-3363 Amstetten-Hausmening, Austria

[21] Appl. No.: 08/863,558

[22] Filed: May 27, 1997

Related U.S. Application Data

[63] Continuation of application No. 08/487,849, Jun. 7, 1995, abandoned.

[30] Foreign Application Priority Data

| Jul. 4, 1994 | [AT] | Austria | 1321/94 |
| Dec. 12, 1994 | [DE] | Germany | 44 44 184 |

[51] Int. Cl.$^6$ ............... B26F 3/00; B26D 3/08
[52] U.S. Cl. ............ 225/96.5; 83/885; 83/879; 83/175; 83/404; 83/455; 83/468.2; 83/468.7; 225/103
[58] Field of Search ............. 83/18, 175, 468.1, 83/468.2, 468.5, 468.6, 468.7, 451, 454, 614, 936, 940, 404, 404.2, 404.3, 455, 879, 883, 884, 885, 886, 887; 225/94, 96, 96.5, 103, 105, 2, 101, 104

[56] References Cited

U.S. PATENT DOCUMENTS

| 3,141,367 | 7/1964 | Keener et al. | 83/468.6 X |
| 3,156,390 | 11/1964 | Hess et al. | 225/2 |
| 3,881,379 | 5/1975 | Stumpf | 83/940 X |
| 4,221,150 | 9/1980 | Bergfelt et al. | 83/886 X |
| 4,382,728 | 5/1983 | Anderson et al. | 83/940 X |
| 4,471,895 | 9/1984 | Lisec, Jr. | 225/96.5 X |
| 4,514,246 | 4/1985 | Forrer et al. | 156/264 |
| 4,676,132 | 6/1987 | Jenkner | 83/468.7 X |
| 5,141,212 | 8/1992 | Beeding | 83/451 X |
| 5,205,196 | 4/1993 | Blaimschein | 83/940 X |
| 5,277,093 | 1/1994 | Kinta | 83/451 X |
| 5,379,815 | 1/1995 | Brazell et al. | 83/451 X |
| 5,398,579 | 3/1995 | Bando | 83/940 X |
| 5,400,939 | 3/1995 | Bando | 225/96.5 X |
| 5,475,196 | 12/1995 | Lisec | 225/96.5 X |
| 5,704,959 | 1/1998 | Lisec | 225/93.5 X |

FOREIGN PATENT DOCUMENTS

| 0 596 852 | 5/1994 | European Pat. Off. . |
| 1627153 | 10/1970 | Germany | 225/94 |
| 32 30 554 | 11/1983 | Germany . |
| 43 30 473 | 5/1994 | Germany . |
| 44 44 184 | 6/1995 | Germany . |

*Primary Examiner*—Rinaldi I. Rada
*Assistant Examiner*—Boyer Ashley
*Attorney, Agent, or Firm*—Young & Thompson

[57] ABSTRACT

Apparatus for dividing laminated glass consists of a device for dividing laminated glass, and a glass cutting table 30 with a cutting bridge 33 which can move along a support and on which a cutting head 38 for scratching plates of glass can move. The device for dividing laminated glass is located on one of the edges of glass cutting table 30 which run parallel to cutting bridge 33. On cutting bridge 33 of glass cutting table 30 there is stop 40 for orienting the laminated glass in the device for dividing laminated glass. Thus the amount of space required is reduced. The device for dividing laminated glass can also be made narrower or can have only one movable support 5 if a support 2 affixed to the frame is made integral with the bearing surface of glass cutting table 30. The glass cutting table is not used to divide the laminated glass: only its cutting bridge is used, and only as an adjustable support for the stop 40.

8 Claims, 11 Drawing Sheets

APPARATUS FOR DIVIDING LAMINATED GLASS

This application is a continuation of application Ser. No. 08/487,849, filed Jun. 7, 1995, now abandoned.

FIELD OF THE INVENTION

The invention relates to an apparatus for dividing laminated glass consisting of a device for dividing laminated glass, and a glass cutting table with a cutting bridge which can move along a support and on which a cutting head for scratching panes of glass can move.

BACKGROUND OF THE INVENTION

Devices for dividing laminated glass are known, in connection with which reference can be made for example to DE 32 30 554 A1.

A device for dividing laminated glass into blanks is known from EP 596 852 A1. In these known devices the film, in contrast to earlier proposals in which the film was melted between the panes of the laminated glass by supplying heat, is cut using a high energy beam which is moved along the opened fracture line in the laminated glass.

The known devices for dividing laminated glass have two supports, and in the area between the two supports means for scratching plates of laminated glass and means for cutting the plastic film provided between the plates of the laminated glass. The actual dividing of the laminated glass along the scratch lines produced in the two glass plates takes place by bending the laminated glass first to one and then to the other side. Dividing however can also be done by exerting pressure on the laminated glass using pressure rollers which are moved along the scratch line so that the scratch line provided in glass plates opposite at the time is opened into a fracture line.

In addition, glass cutting tables are known on which glass plates are scratched using a cutting tool (cutting wheel) which is mounted on a cutting head which can be moved along a cutting bridge. The glass plates are later divided (broken) along the scratch lines.

SUMMARY OF THE INVENTION

The problem of the invention is to combine a glass cutting table and a device for dividing laminated glass with one another in order to save space (installation area) and to reduce cost overall.

According to the invention this problem is solved by the device for dividing the laminated glass being located on one of the sides of the glass cutting table which runs parallel to the cutting bridge, and a stop for the laminated glass to be divided being provided on the cutting bridge of the glass cutting table.

The fact that the device for dividing the laminated glass is located next to the glass cutting table makes it possible to use the cutting bridge of the glass cutting table as a carrier for a stop for aligning the laminated glass relative to the means for scratching the two plates of the laminated glass which is provided on the device for dividing the laminated glass.

Moreover, the bearing surface or table of the glass cutting table can be used as one of the two supports of the device for dividing laminated glass. This not only simplifies the apparatus, but also saves installation space.

The stop provided on the cutting bridge can be a continuous stop strip or can consist of several stop parts.

In one version of the invention it is provided that the stop can be moved from an active position which has approached the bearing surface of the glass cutting table into a position distant from it and back again. In this way the stop can be raised from the surface of the glass cutting table when it is not needed so that transport of glass plates or laminated glass or parts thereof is not hindered.

The specific execution of the device used in the arrangement according to the invention for dividing laminated glass is largely optional.

To simplify the transport of laminated glass or glass plates it can be provided that the support of the device for dividing laminated glass facing away from the glass cutting table is formed as an air cushion conveyor and/or belt or roller conveyor for the transport of panes of glass and/or laminated glass.

It is to be understood that the glass cutting table does not perform a glass cutting function in the environment of the present invention. Instead, its bridge serves only as the support for the stop by which the laminated glass to be divided is properly positioned for that operation, that stop being movable with that bridge in a horizontal direction perpendicular to the line along which the laminated glass is to be divided.

BRIEF DESCRIPTION OF THE DRAWINGS

Other details and advantages of the invention follow from the following description in which reference is made to the attached drawings in which embodiments of the invention are shown.

FIG. 11 shows the machine frame from FIG. 10 in another view and.

DESCRIPTION OF THE PREFERRED EMBODIMENTS

Figure 1:
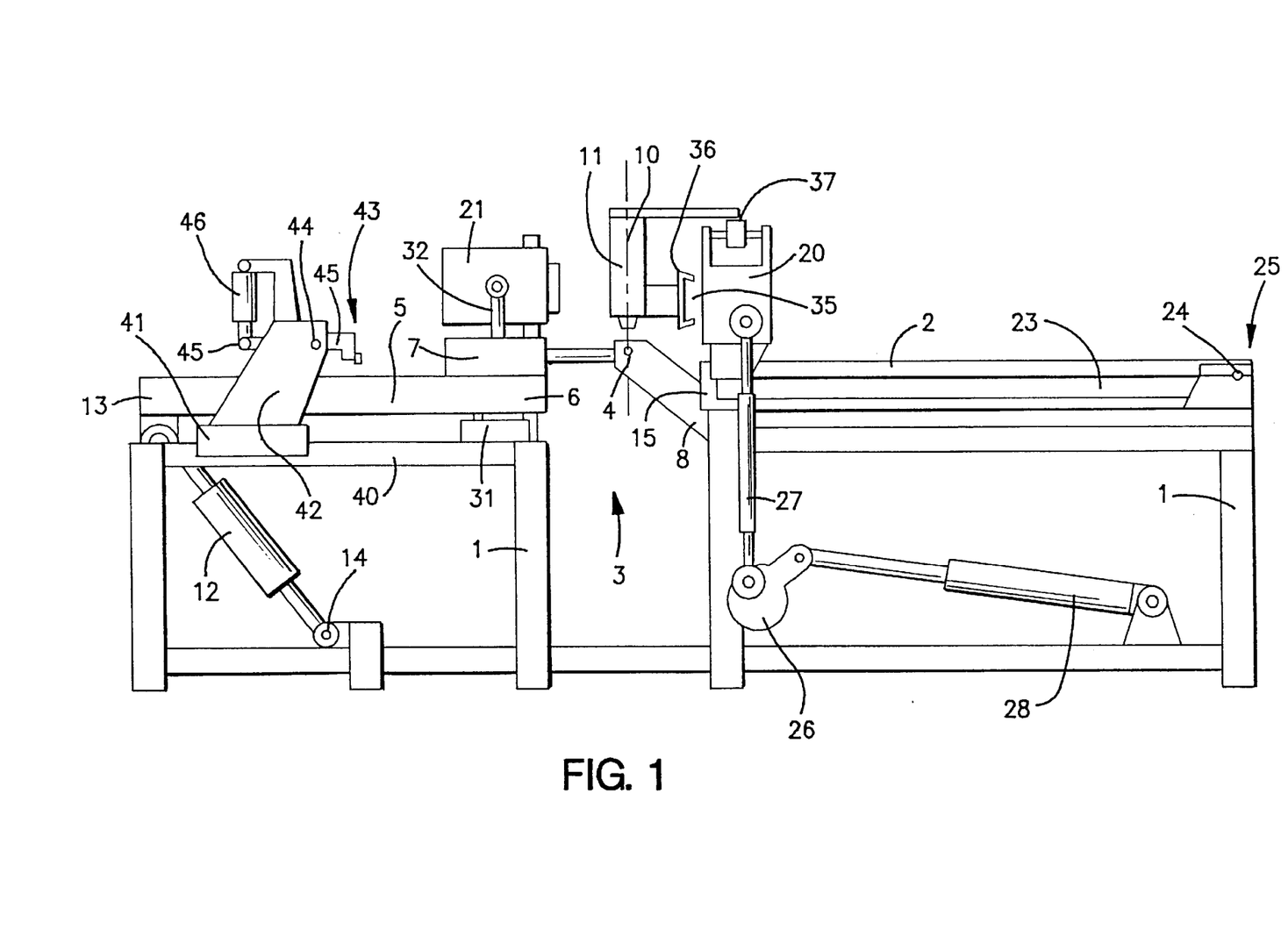
FIG. 1 shows first embodiment of a device for dividing laminated glass in a side view.

The version of a device for dividing laminated glass shown in FIG. 1, as can be combined according to the invention with a glass cutting table, has machine frame 1 in which in FIG. 1 right support 2 affixed to the frame is mounted for the laminated glass to be divided. Support 2 affixed to the frame is provided for example with a felt covering and has openings which can be selectively pressurized with an overpressure or negative pressure so that feed of the laminated glass to be divided is facilitated (air cushion) or so that it can be held securely when the openings in support 2 are pressurized with negative pressure. Support 2 affixed to the frame can (and in all embodiments of the device for dividing laminated glass yet to be described) be formed integrally with the bearing surface ("table") of a glass cutting table and thus form a larger or smaller part or the entirety of this bearing surface. Support 2 however can also be located directly next to the glass cutting table or at a distance from it (see FIG. 3).

At a distance (gap 3) next to support 2 affixed to the frame is support 5 which can swivel around axis 4 (on the left in FIG. 1) in machine frame 1. In the area of edge 6 of swivelling support 5 facing gap 3 between two supports 2 and 5 two hydraulic motors 7 are mounted with piston rods which are bearing mounted to swivel on brackets 8. Brackets 8 are mounted on the two sides of machine frame 1 in the area of support 2 affixed to the frame. Axis 4 around which support 5 can be swivelled is located in plane of symmetry 10 of gap 3 between supports 2 and 5 in which also the cutting tools 106 (one from above and one from below) as well as the cutting means 11 act for cutting the film provided between the panes of the laminated glass act.

To swivel support 5 on the left in FIG. 1 there is hydraulic motor 12 which is joined to edge 13 of the frame of support 5 roughly in its center, the edge being opposite gap 3 between two supports 2 and 5, and which is supported with its other end in bearing 14 which is affixed to the machine frame 1.

Clamping beams 20 and 21 which can be lowered onto supports 2 and 5 in order to secure the laminated glass to be divided on supports 2 and 5 are assigned to two edges 15 and 6 of two supports 2 and 5, the edges facing one another. In addition or alternatively there can be suction devices (similar to suction devices 22 of FIG. 2 or FIG. 3) which are supplied with negative pressure in supports 2 and 5 in the area of their edges 6, 15 facing one another in order to support holding of the laminated glass to be divided. In particular, the suction devices can also be used to secure laminated glass which has been aligned accordingly for a cut opposite the cutting tools until clamping beams 20, 21 have been lowered.

Clamping beam 20 which is assigned to support 2 affixed to the frame is carried by two connecting rods which are swivel-supported in machine frame 1 via ball pivots 24 in the area of edge 25 of support 2 affixed to the frame, the edge facing away from gap 3 between two supports 2, 5. To raise and lower clamping beam 20 relative to support 2 affixed to the frame there is a crank-push rod drive (crank 26, push rod 27, cylinder 28).

Clamping beam 21 on movable support 5 is guided in the example of FIG. 1 by two guide rods 30° which are provided in the area of the ends of clamping beam 21 and penetrate the guide sleeves provided there. To raise and lower clamping beam 21 there are spindle drives 31 which engage its two ends; spindles 32 of the spindle drives are connected to clamping beam 21. Guide rods 30° and the feed nuts of spindle drives 31 are mounted on the frame of support 5. In order to effect uniform raising of clamping beam 21 which is assigned to movable support 5, two spindle drives 31 are coupled to a common drive motor via shafts.

On clamping beam 20 which is assigned to support 2 affixed to the frame there is guide rail 35 on which a cutting tool 106 and cutting means 11 are movably guided via carriage 36. To move the cutting tool 106 and cutting means 11 along gap 3 between two supports 2 and 5 in plane of symmetry 10 there is endless belt drive 37 to which carriage 36 is coupled.

A cutting tool 106 which acts from underneath on the laminated glass in order to scratch its bottom pane is guided on a guide rail (not shown) which is attached to edge 15 of support 2 affixed to the frame, the edge facing gap 3 between two supports 2 and 5.

On guide rails 40 mounted in machine frame 1 on either side of movable support 5 carriages 41 are guided which bear stop strip 43 on arms 42 which project upward and which are interconnected. Stop strip 43 is mounted on bearings on arms 42 to swivel around axis 44 parallel to support 5 so that it can be raised or lowered. For this reason stop strip 43 is attached to levers 45 which can swivel around axis 44 and which are engaged by hydraulic cylinder 46. Raising and lowering of stop strip 43 are used to prevent hindering the movements of swivelling support 5. Stop strip 43 can be omitted since the stop of the glass cutting table still to be described is provided for aligning the laminated glass to be divided.

Figure 4:
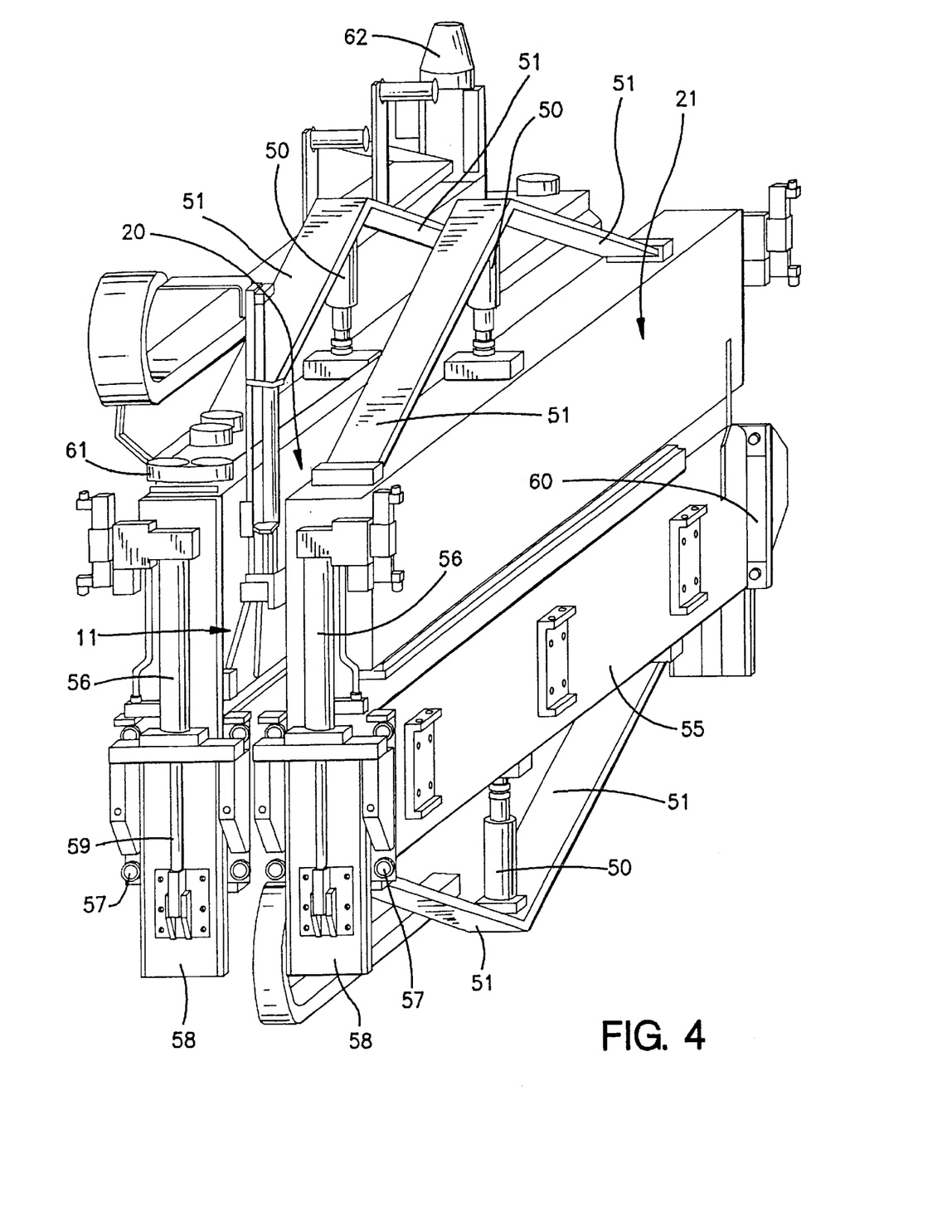
FIG. 4 shows a detail of another embodiment of a device for dividing laminated glass.

To prevent flexing of clamping beams 20, 21 when they press the laminated glass against supports 2 and 5, uprights 50 (FIG. 4) which point upward in the middle of two clamping beams 20, 21 can be provided, by which tie rods 51 are guided to the two ends of clamping beams 20, 21 and are attached there. By prestressing tie rods 51 by actuating uprights 50 formed as hydraulic cylinders, clamping beams 20, 21 are also prestressed so that the laminated glass is pressed uniformly over the entire length against supports 2 and 5. Similarly structured reinforcement with uprights 50 which point downward can be provided on edges 15, 6 of supports 2 and 5, the edges adjacent to gap 3, or the parts of machine frame 1 or of the frame of supports 2, 5 located there (FIG. 4).

Figure 2:
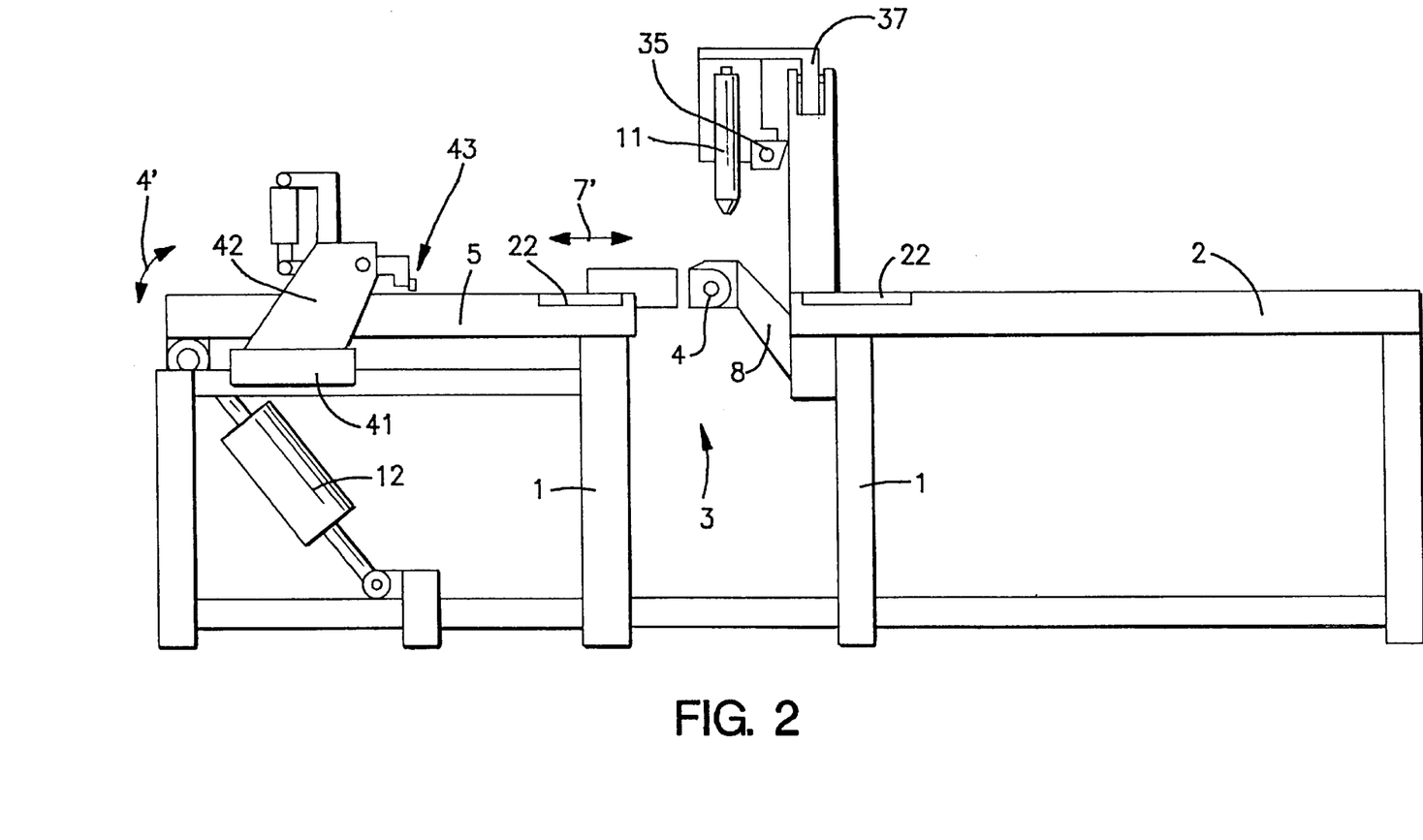
FIG. 2 shows another embodiment.

The device shown in FIG. 2 has two supports 2 and 5 designed to facilitate transport and also as an air cushion table and/or can be equipped which conveyor means (conveyor belts). Supports 2 and 5 are mounted in machine frame 1, for which support 2 which as described above for the embodiment of FIG. 1 can be a bearing surface of the glass cutting table or a part thereof, is rigidly mounted in machine frame 1, conversely support 5 can be swivelled around axis 4 (arrow 4'). Since support 5 is attached via at least two hydraulic motors 7 to bearings 14 affixed to the machine frame, it can additionally be moved away from support 2 in the sense of double arrow 7' and can be again caused to approach it. To execute the swivel motion of support 5 at least one hydraulic motor 12 is provided which is preferably a double acting hydraulic motor with zero position which corresponds to the location of support 5 in which it is aligned parallel to support 2.

In the area of gap 3 between supports 2 and 5 there are a cutting tool and cutting device 11 for cutting the plastic film provided between the laminated glass panes.

In machine frame 1 in the area of support 5 there is another movable stop 43 for fixing the cutting position.

In order to be able to secure the laminated glass to be divided on supports 2 and 5, in supports 2 and 5 of the embodiment according to FIG. 2 there is least one row of suction devices 22 each which are connected via lines not shown to a negative pressure source. These rows of suction devices are provided in the vicinity of edges 6, 15 of supports 5 and 2, the edges adjacent to gap 3.

Figure 3:
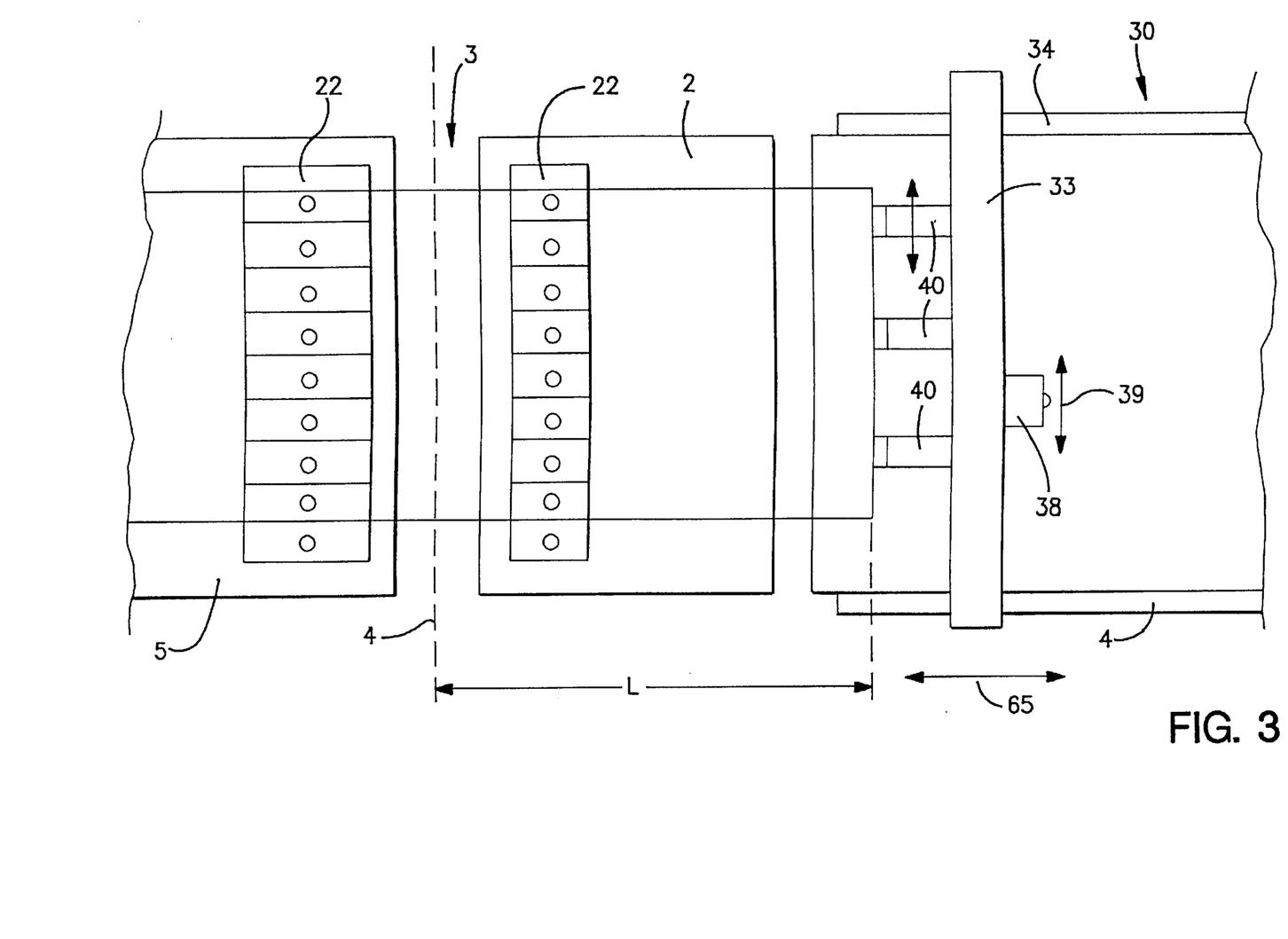
FIG. 3 shows an arrangement of a device for dividing laminated glass and a glass cutting table.

As is especially apparent from FIG. 3, suction devices 22 are located directly next to one another. Suction devices 22 can be pressurized with negative pressure independently of one another so that only suction devices 22 which are entirely covered by the laminated glass are pressurized with negative pressure. Suction devices 22 outside of the laminated glass or only partially covered suction devices 22 are not pressurized with negative pressure. For this purpose an automatic control can be provided which acquires the width of the laminated glass and activates covered suction devices 22. However, valves which close when no negative pressure builds up in suction device 22 can also be assigned to suction devices 22. The embodiment shown in FIG. 2 is intended especially for thin laminated glass. It goes without saying that combinations of the means shown in FIGS. 1 through 6 are also possible, with which the laminated glass is fixed and held on supports 2 and 5 during scratching, breaking and cutting of the film.

The arrangement according to the invention shown in FIG. 3 in an overhead view consists of a glass cutting table 30 along which cutting bridge 33 can move on guide rails 34. Cutting head 38 which carries a scratching tool such as a cutting wheel 39 for scratching panes of glass or laminated glass can also move on cutting bridge 33 in its longitudinal direction.

Next to one edge of cutting table 30 oriented parallel to cutting bridge 33 is a device for dividing laminated glass. This device surrounds support 2, 5 and, in the area of gap 3 in FIG. 3, means which are not detailed for scratching the two laminated glass plates and a means for cutting the plastic film which is located between the two plates of laminated glass 15. This means for cutting can be a blade (knife) or a means for melting the lamination film which can be designed for example as a laser means, as a plasma torch (EP 596 822 A1), as a heating rod or as a hot air nozzle (DE 32 50 554 A1).

To divide laminated glass if it has been scratched on both sides at the stipulated point the laminated glass is bent, for which, for example, support 5 is swivel mounted opposite support 2 which is flush with the bearing surface of glass cutting table 30 and is formed integrally with it. Possibilities for dividing laminated glass and the devices suitable for this purpose which can be used in the arrangement as per the invention are shown in FIGS. 1, 2 and 4 through 14.

To orient the laminated glass along the zero line shown by a broken line in FIG. 3 in the embodiment of an arrangement according to the invention shown in FIG. 3, on cutting bridge 33 is a stop which in the embodiment shown consists of three stops 40'. Stops 40' are oriented opposite the zero line by adjusting cutting bridge 33 (arrow 65 in FIG. 3) such that they have distance "L" from the zero line which correspond to the size of the section of laminated glass to be produced. At this point the laminated glass is advanced until its forward edge lies against stops 40', whereupon the laminated glass can be divided. To remove the separated part of the laminated glass and to feed (normal) flat glass which is to be scratched on cutting table 30, stops 40' are lifted off of the bearing surfaces (table).

The execution of the device for dividing laminated glass 15 and how it works are not of primary importance for this invention. The embodiments of these devices shown in FIGS. 1, 2 and 4 through 14, their construction described using the figures and manner of operation should therefore be understood only as preferred examples.

Figure 5:
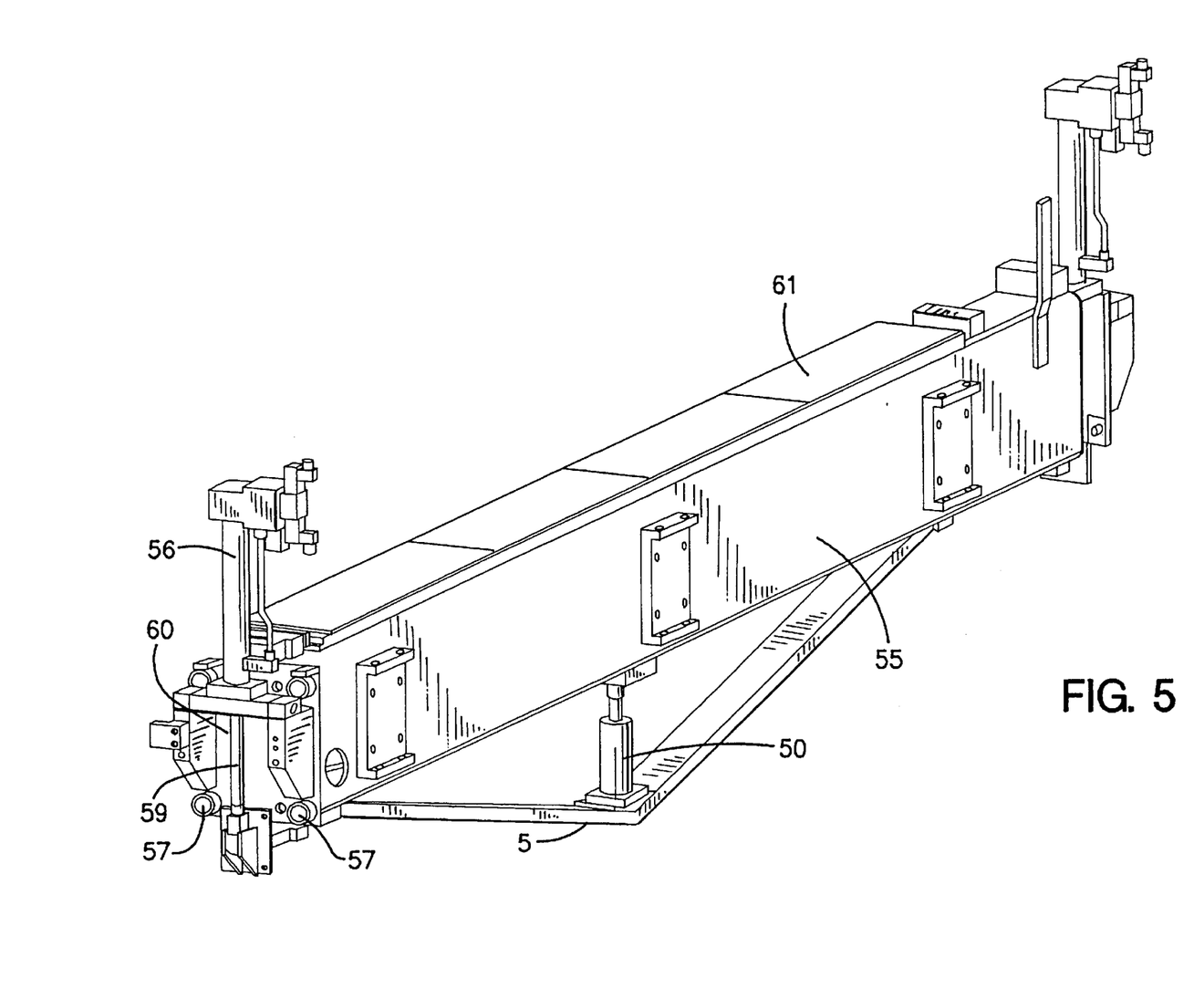
FIGS. 5 and 6 show individual parts of the clamping device for fixing the laminated glass on the supports of the embodiment of FIG. 4, FIG. 7 in an oblique view a cutting means with a blade.
Figure 6:
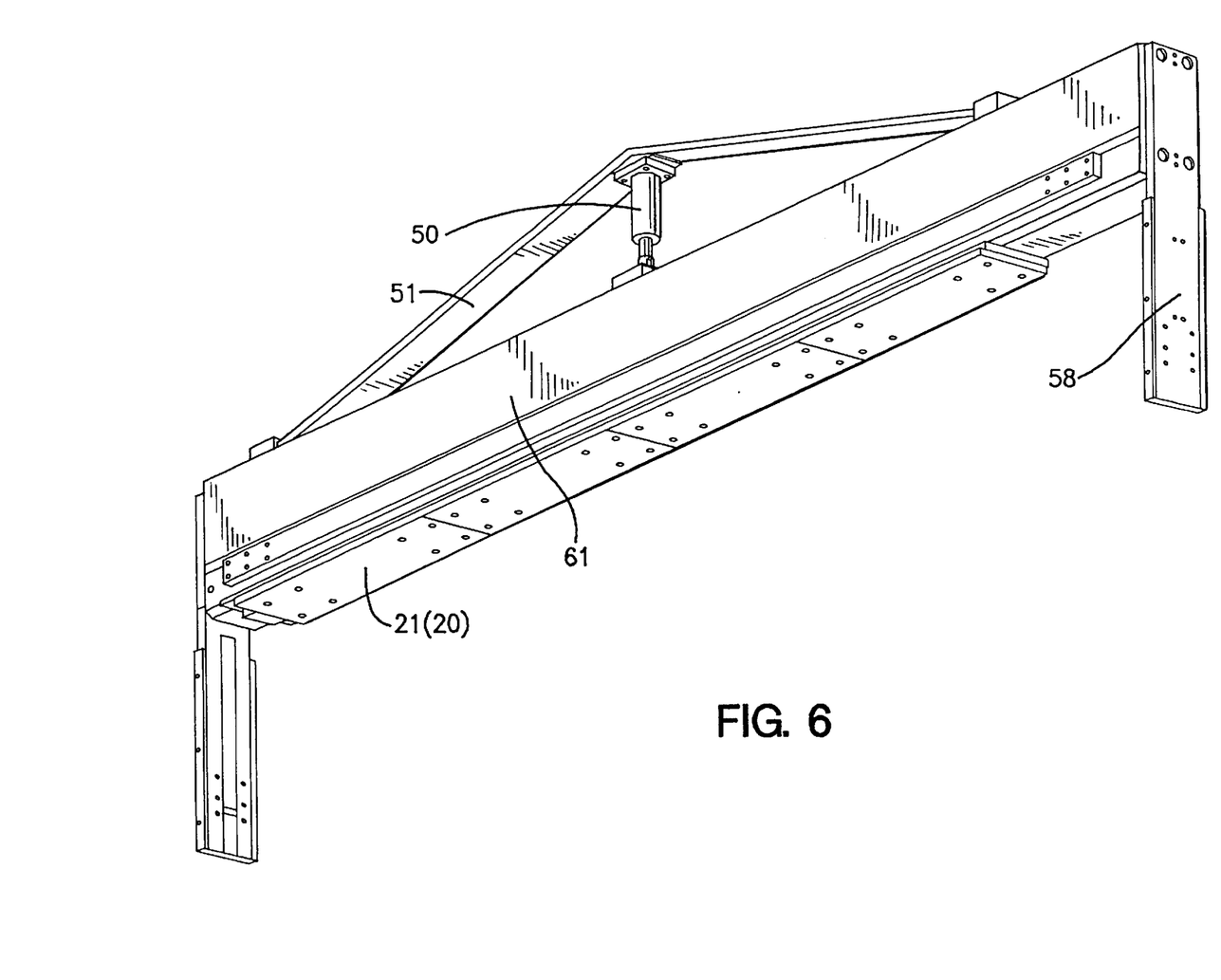

In the embodiment of a device for dividing laminated glass shown in FIGS. 4 through 14, in the area of the edges of two supports 2,5 the edges being adjacent to gap 3, there are clamping means 103, 104 of the embodiment shown in FIG. 4. Here the parts of the clamping means (stiffening beams 55) located under supports 2, 5 are permanently joined to the parts of the device which bear supports 2 and 5. Stiffening beams 55 located above supports 2 and 5 can be adjusted up and down using hydraulic cylinders 56, i.e., can be raised and lowered perpendicularly to supports 2 and 5. Details of one of clamping beams 103, 104 are shown in FIG. 6, conversely details of one of stiffening beams 55 are shown in FIG. 5. FIG. 5 also shows the arrangement of hydraulic cylinders 56 which move clamping beams 103, 104 perpendicularly to supports 2, 5.

It is shown in FIG. 5 that on the ends of stiffening beams 55 mounted on a plate are guide rollers 57 which lie against lateral, plate-shaped guide attachments 58 of clamping beams 103, 104 from the outside and which guide them perpendicularly to the plane of supports 2 and 5. To couple clamping beams 103, 104 to cylinders 56 which drive them, piston rods 59 of actuating cylinders 56 are coupled to guide attachments 58 of clamping beams 103, 104, conversely cylinders 56 are attached on base plate 60 which bears guide rollers 57. The overall arrangement of the drives for clamping beams 103, 104 is also shown in FIG. 4.

Supports 62 are attached on the surfaces of clamping beams 103, 104 and stiffening beams 55 facing one another.

FIG. 4 also shows that in the embodiment shown in FIGS. 4 through 14 the two cutting tools 101 and means 11 for cutting the plastic film located between the panes of laminated glass on clamping beam 103 assigned to support 2 affixed to the frame or stiffening beam 55 assigned to this support, i.e., they can be moved on guide rails attached directly or indirectly to these parts. Also the drives, for example, endless belt drive 61 assigned in FIG. 4 for the combined scratching and cutting means (cutting tool and cutting means 11), are likewise set up on clamping beam 103 in the same way as assigned drive motor 105.

Means 11 for cutting plastic film between the panes of the laminated glass (see FIG. 7 and 8) is mounted on plate 70 which is guided on two guide rods 71 via slide bushes 72 and can be adjusted along these guide rods 71 by hydraulic cylinder 73 perpendicularly to the plane of two supports 2, 5. Holder 75 for blade 76 is mounted on plate 70 to swivel around axis 74 horizontally and parallel to the plate. The capacity of holder 75 to swivel around axis 74 can be blocked using locking wedge 78 which is activated by hydraulic cylinder 77 and released again by raising locking wedge 78.

Figure 7:
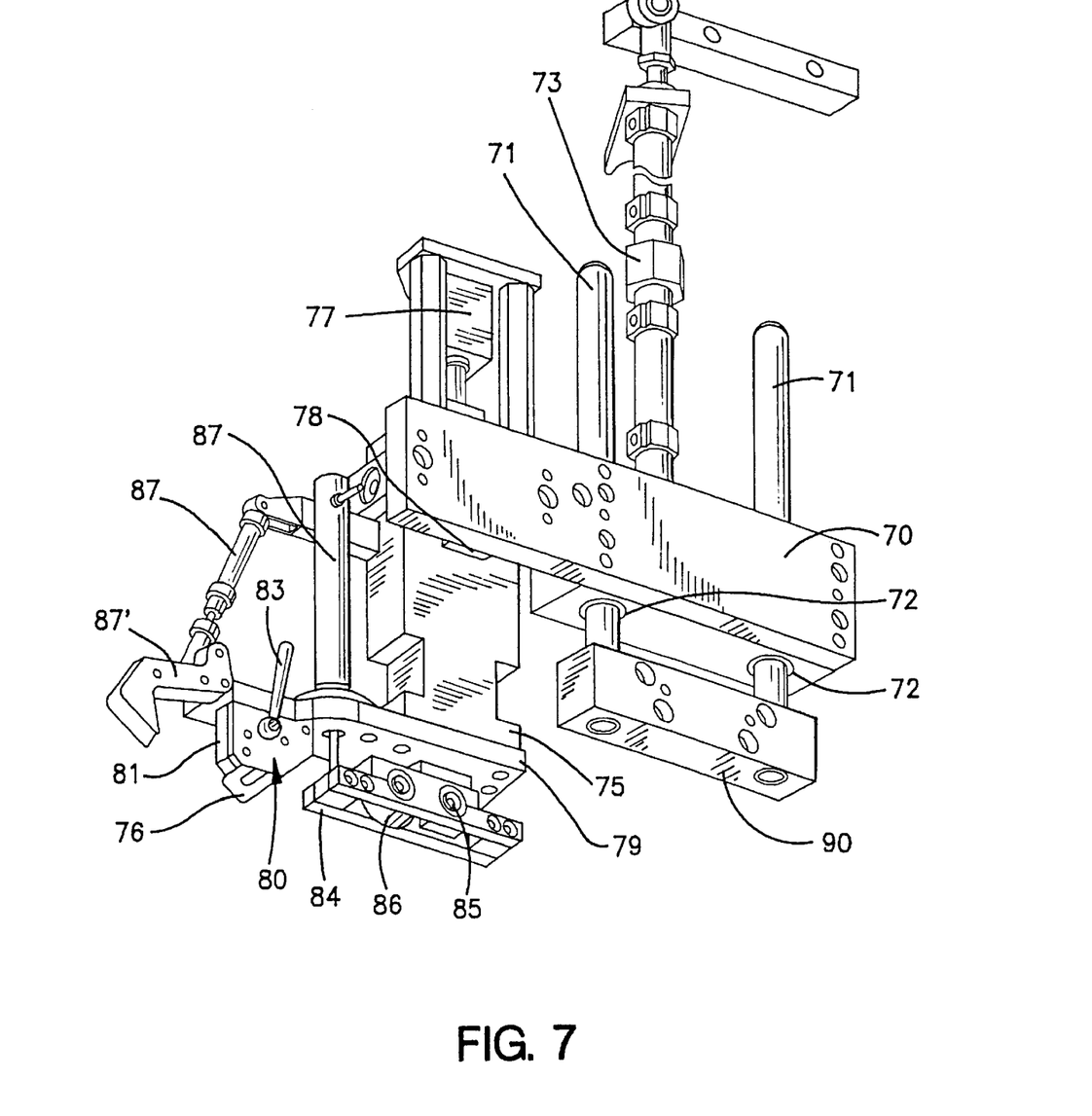
Figure 8:
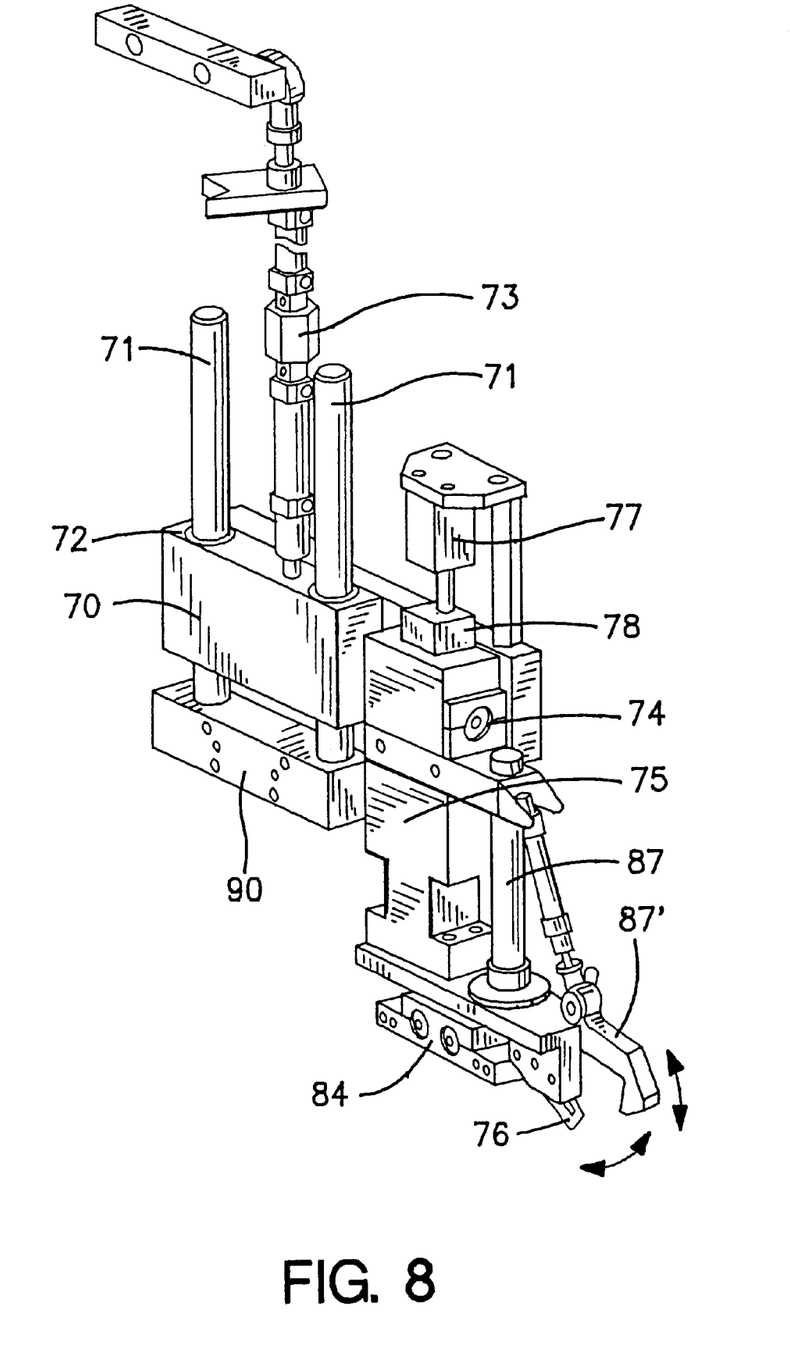
FIG. 8 shows the cutting means in another view, FIGS. 9.1. to 9.4.1. show individual phases in the dividing of laminated glass.
Figure 10:
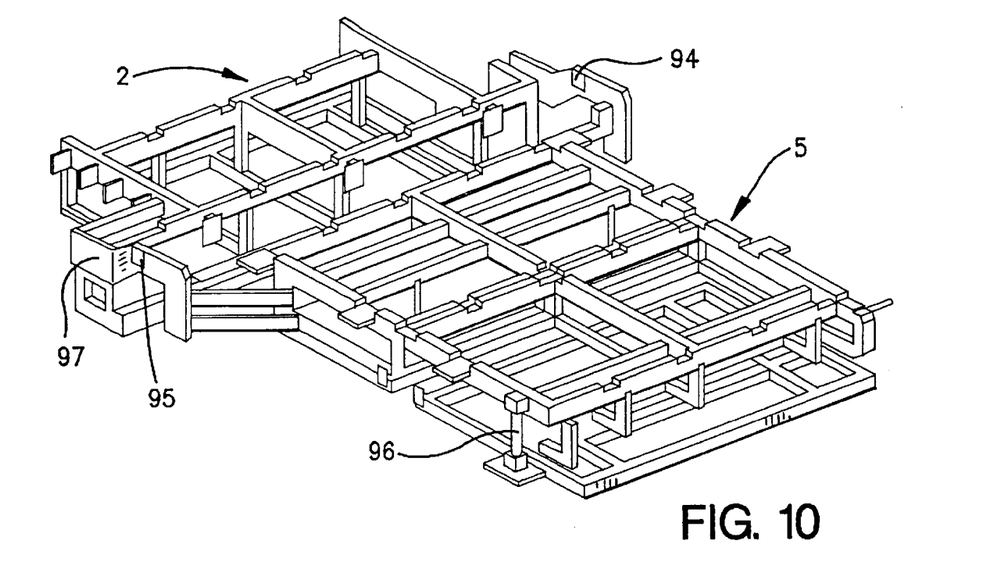
FIG. 10 shows the machine frame of the embodiment of FIG. 4 without the supporting plates and the clamping means.
Figure 11:
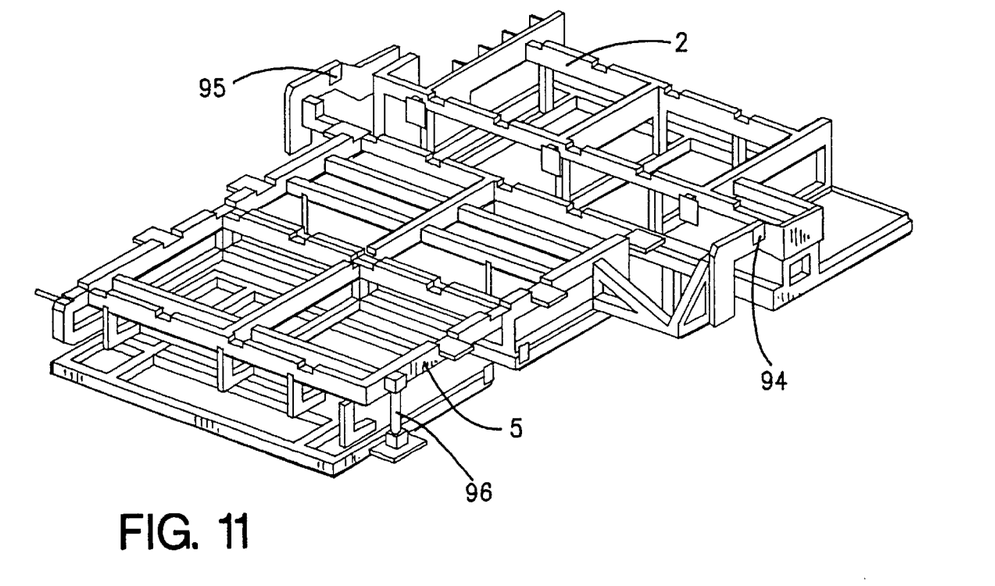
Figure 12:
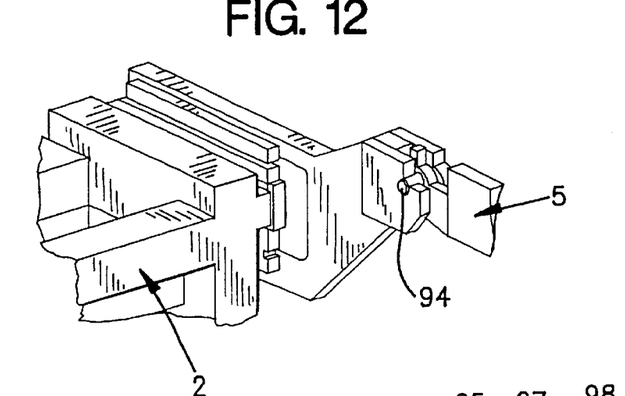
FIGS. 12, 13, and 14 show details of the mounting of the swivelling support in different views.

On the lower end of holder 75 is mounted base plate 79 which on one end bears clamping means 80 for fixing blade 76 in position. Clamping means 80 consists of blade seat 81 permanently joined to base plate 79 and clamping plate which can be clamped against blade seat 81 using clamping lever 83 for fixing blade 76 in position.

Carrier 84 for a measurement and tracking wheel 86 is furthermore supported on base plate 79 around axis 85 which is aligned perpendicularly to the direction of movement of the cutting tools in the area between two supports 2 and 5 and horizontally. The free end of this support 84 is coupled to switch 89. Measurement and tracking wheel 86 runs in a wedge-shaped gap formed by drawing apart the two parts of the laminated glass pane after breaking the two panes of glass (see FIG. 9) and moves as it strikes a barrier which is present if necessary in the gap from the latter upwards so that switch 89 is activated and causes blade 76 being to be lifted out of the gap.

When blade 76 is moved along the gap between the laminated glass parts, the lock for the swivelling capacity of holder 75 around axis 74 is released (locking wedge 78 is raised) so that blade 76 runs from measurement and tracking wheel 86 which runs along the edges of the gap, always guided in its center.

Instead of switch 89, an element which acquires the swivelling of carrier 84 for guide wheel 86, for example, an electronic guide bar, can be provided. By means of the signals delivered from the guide bar the twisting (still to be explained) of support 5 for opening the break to a wedge-shaped gap can be controlled such that guide wheel 86 and thus blade 76 dip far enough into the wedge-shaped gap to reliably cut through the film.

On base plate 79 furthermore there is swivel-mounted safety flap 87 for blade 76 which can be swivelled using hydraulic cylinder 88 into a position which releases blade 76, which is shown in FIG. 7, and which overlaps blade 76.

On pad 90 located underneath on guide rods 71 is the cutting tool (cutting wheel) 101 for scratching the upper pane of laminated glass. A similar cutting tool 101 is mounted on a carriage 102 which can move on a guide underneath the bearing plane for the laminated glass, the two panes of the laminated glass being scratched preferably at the same time by the cutting tools, i.e., from the top and from the bottom.

The progression of the functions glass cutting, breaking and film cutting is shown in FIG. 9 and explained using the figure. It is apparent from FIG. 9 that for the laminated glass clamped between clamping beams 103, 104 and abutments 55 cutting takes place at the same time on the top and bottom (FIG. 9.1). Hereupon first the upper (or the lower) and then the lower (or the upper) pane of glass is broken by swivelling movable support 5 so that a continuous break is formed along the previously produced scratch lines (FIGS. 9.2 and 9.3). Then support 5 which can move relative to support 2 affixed to the frame together with clamping beam 21 and abutment (stiffening beam) 55 opposite the latter (underneath) is swivelled around fulcrum 90 which lies outside of supports 2, 5 without tilting them so that the end of the break remote from fulcrum 92 is opened and the film is stretched there (see FIG. 9.4). At this point blade 76 guided by measurement and tracking roller 86 is lowered into gap 91 between the laminated glass parts and cuts the film as movement continues along gap 91. In doing so the movable support is increasingly swivelled, as is illustrated in 9.4.1 by the rotary positions shown.

In order to be able to swivel movable support 5 for breaking (around horizontal axis 4 which is located in the area of gap 3 between two supports 2, 5) and furthermore in order to be able to twist a vertical axis (fulcrum 92) which is located outside of supports 2, 5, the machine frame is designed for example as is shown in FIGS. 10 through 14 (without the plates which form the actual supports). End 6 of movable support 5, the end facing support 2 affixed to the frame, can swivel around two bearings 94, 95 with axes located at the height of the bearing surface (see FIGS. 9.2 and 9.3). To do this a hydraulic cylinder 96 (corresponding to cylinder 12) with which the end of support 5, that is, the end away from gap 3, can be raised and lowered to break the laminated glass after the latter has been scratched, is attached to the frame of movable support 5 on both sides (see FIGS. 9.2 and 9.3).

Figure 13:
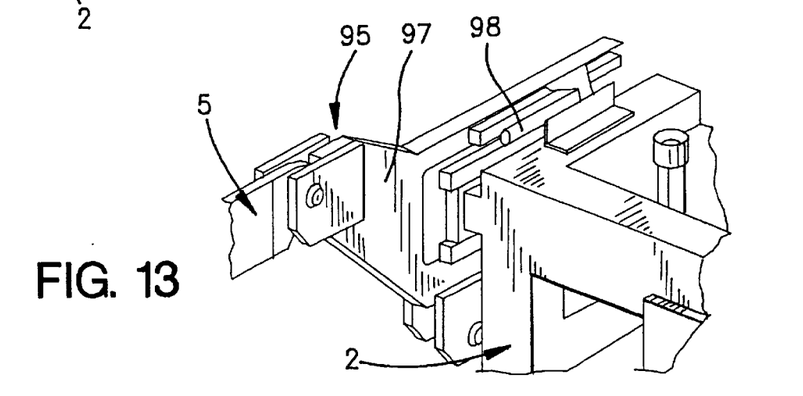
Figure 14:
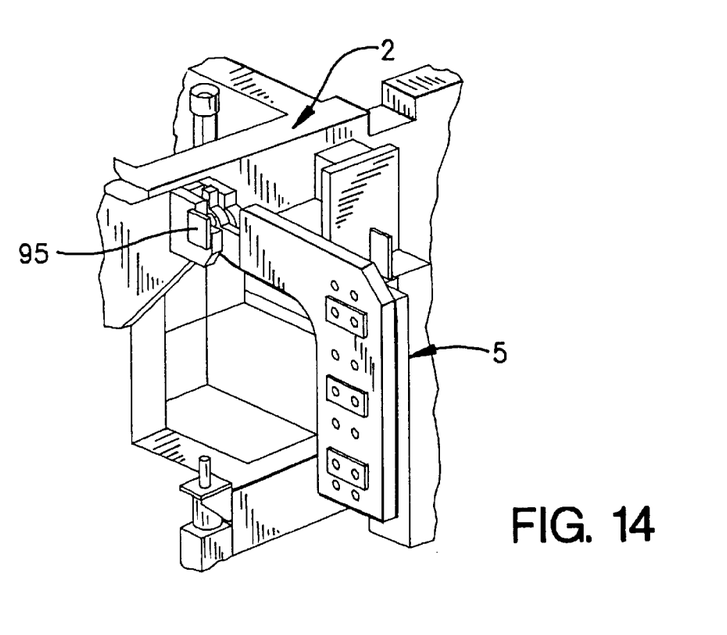
Figure 91:
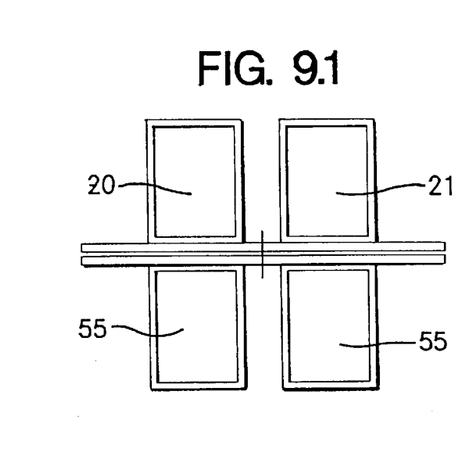
Figure 92:
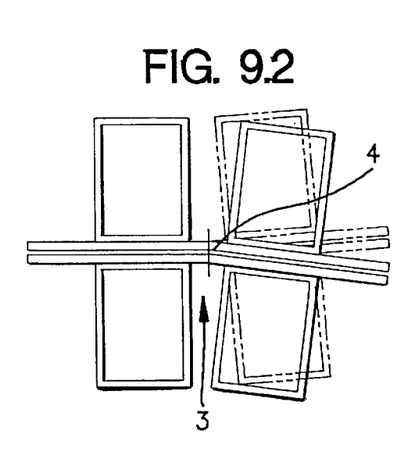
Figure 93:
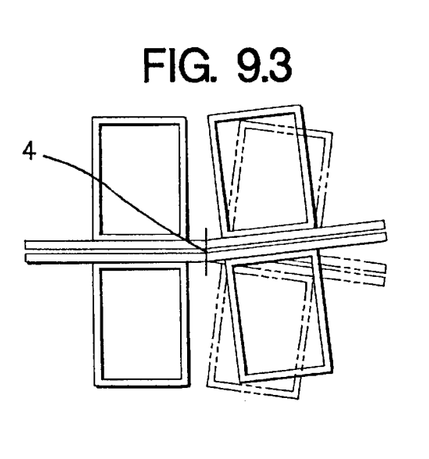
Figure 94:
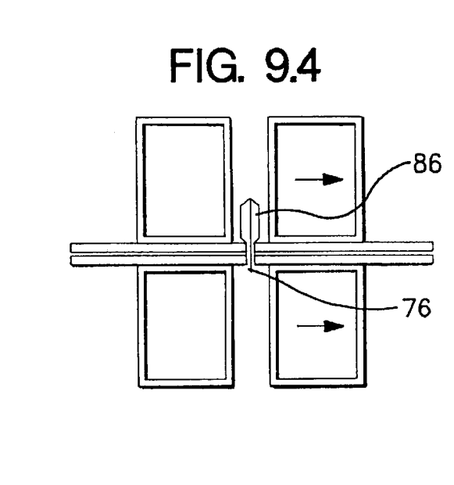

In addition, one of the two swivel bearings, specifically bearing 95, can be adjusted in a direction parallel to the bearing surface (horizontally) as is shown in FIGS. 13 and 14. By activating the hydraulic motor (not shown) which engages carrier 97 of bearing 95, movable support 5 turns around fulcrum 92 which is shown in FIG. 9.4.1. and which is formed by bearing 94 so that the break in the two laminated glass panes, as shown in FIG. 9.4.1., opens into a wedge-shaped gap. The amount of turning of movable support 5 is acquired, for example, by electronic measuring means 98 which also controls the activation of the hydraulic cylinder for turning support 5.

In summary, the invention can be described for example as follows:

An arrangement for dividing laminated glass consists of a device for dividing laminated glass, and glass cutting table 30 with cutting bridge 33 which can move along a support and on which cutting head 38 for scratching plates of glass can move. The device for dividing laminated glass is located on one of the edges of glass cutting table 30 which run parallel to cutting bridge 33 On cutting bridge 33 of glass cutting table 30 there is stop 40' for orienting the laminated glass in the device for dividing laminated glass relative to the scratching tools of this device. Thus the amount of space required is reduced and cutting bridge 33 with stop 40' provided on it can be used to orient the laminated glass relative to the means for scratching the laminated glass panes. The device for dividing laminated glass can also be made narrower or can have only one movable support 5 if support 2 affixed to the frame is made integral with the bearing surface of glass cutting table 30.

It is particularly to be understood that the cutting head 38 and cutting wheel 39 shown in FIG. 3 are not used in the environment of the present invention. Instead, all that is used of the conventional cutting table 30 shown in the right of FIG. 3 is the cutting bridge 33, which now is used only as a support for stops 40'. Other supports could be used, but they would not have the advantage of the use of bridge 33, because bridge 33 is movable in the direction of arrow 65 in FIG. 3, thereby to position the stops 40' so as properly to locate the line along which the laminated glass is to be divided.

I claim:

1. Apparatus for dividing laminated glass and for cutting non-laminated glass, comprising a laminated glass dividing work station and a separate non-laminated glass cutting work station;

said glass cutting work station including a substantially horizontal glass cutting table (30) having a plurality of sides, and an elongated cutting bridge (33) mounted for movement over the cutting table (30) in a direction (65) perpendicular to the length of the cutting bridge (33), said cutting bridge having a cutting head movable lengthwise of the cutting bridge, said cutting head being designed and arranged to score only one side of said non-laminated glass;

said laminated glass dividing work station including a device for dividing laminated glass located on one of the plurality of sides of said glass cutting table (30) which run parallel to said cutting bridge (33), said device for dividing laminated glass comprising means for scoring opposing surfaces of said laminated glass, means for bending said laminated glass, and means for cutting an intermediate plastic film, said cutting bridge (33) of said glass cutting table (30) having stop means (40') for positioning the laminated glass to be divided by said device for dividing laminated glass.

2. Apparatus according to claim 1, wherein the stop means (40') is formed by at least two stops spaced apart along the length of said cutting bridge (33).

3. Apparatus according to claim 1, wherein the device for dividing laminated glass has two rows of suction devices (22) which are aligned parallel to said cutting bridge (33) of said glass cutting table (30) for securing the laminated glass to be divided.

4. Apparatus according to claim 1, wherein the device for dividing laminated glass further comprises clamping means (20, 21 or 103, 104) for securing the laminated glass to be divided.

5. Apparatus according to claim 1, wherein a support (2) of the device for dividing laminated glass is integral with a bearing surface of said glass cutting table (30).

6. Apparatus according to claim 1, wherein the device for dividing laminated glass further comprises two supports, one of said two supports (5) being remote from said glass cutting table (30) and mounted to swivel around a horizontal axis (4) which lies in an area of a gap (3) between said two supports (2) and (5) for glass to be divided.

7. Apparatus according to claim 1, wherein a support (5) of the device for dividing laminated glass remote from the glass cutting table is mounted to swing around an axis (90) which is perpendicular to a coacting support (2) adjacent an end of an elongated gap (3) between said supports (2 and 5).

8. Apparatus for dividing laminated glass and for cutting non-laminated glass, comprising a laminated glass dividing work station and a separate non-laminated glass cutting work station;

said glass cutting work station comprising:
  substantially horizontal glass cutting table (30); and
  an elongated cutting bridge (33) slidably mounted for movement over the cutting table (30) in a direction (65) perpendicular to the length of the cutting bridge (33);

said laminated glass dividing work station being located adjacent said glass cutting table (30) and comprising:
  means for scoring opposing surfaces of said laminated glass parallel to said cutting bridge (33);
  means for bending said laminated glass;
  means for cutting an intermediate plastic film; and two supports for supporting the laminated glass to be cut;
  said cutting bridge (33) of said glass cutting table (30) having a cutting head movable lengthwise along the cutting bridge and designed to be used for cutting non-laminated glass in the glass cutting work station, said cutting bridge also having stop means (40') designed to be used for positioning laminated glass in the laminated glass dividing work station.

\* \* \* \* \*